United States Patent
Edpalm

(10) Patent No.: US 11,457,228 B2
(45) Date of Patent: Sep. 27, 2022

(54) VIDEO ENCODING METHOD AND METHOD FOR REDUCING FILE SIZE OF ENCODED VIDEO

(71) Applicant: Axis AB, Lund (SE)

(72) Inventor: Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 200 days.

(21) Appl. No.: 17/025,227

(22) Filed: Sep. 18, 2020

(65) Prior Publication Data

US 2021/0092412 A1    Mar. 25, 2021

(30) Foreign Application Priority Data

Sep. 23, 2019   (EP) ..................... 19198966

(51) Int. Cl.
*H04N 19/184*   (2014.01)
*H04N 19/172*   (2014.01)
*H04N 19/169*   (2014.01)

(52) U.S. Cl.
CPC ......... *H04N 19/184* (2014.11); *H04N 19/172* (2014.11); *H04N 19/1883* (2014.11)

(58) Field of Classification Search
CPC ............... H04N 19/184; H04N 19/172; H04N 19/1883; H04N 19/114; H04N 19/132; H04N 19/31; H04N 19/39; H04N 19/40; H04N 19/507; H04N 19/58; H04N 19/107; H04N 19/159; H04N 19/426
See application file for complete search history.

(56) References Cited

U.S. PATENT DOCUMENTS

| 2009/0220003 | A1 | 9/2009 | Streater |
| 2011/0090965 | A1* | 4/2011 | Chan .................. H04N 19/597 375/E7.104 |
| 2017/0078678 | A1 | 3/2017 | Guedalia et al. |

FOREIGN PATENT DOCUMENTS

| CN | 101272494 A | | 9/2008 | |
| CN | 102075756 A | | 5/2011 | |
| JP | 2016519466 A | * | 6/2016 | |
| KR | 980011300 A | * | 4/1998 | |
| WO | WO-2008108566 A1 | * | 9/2008 | ........... H04N 19/186 |
| WO | WO-2008133455 A1 | * | 11/2008 | ........... H04N 19/105 |

OTHER PUBLICATIONS

Extended European Search Report dated Feb. 11, 2020 for the European Patent Application No. 19198966.4.
Yu et al., "A redundant frame strategy towards error robustness for the H.264-based scalable video coding systems" (2007).

* cited by examiner

*Primary Examiner* — Tracy Y. Li
(74) *Attorney, Agent, or Firm* — Volpe Koenig

(57) ABSTRACT

A video encoding method comprises encoding a series of images of original video data into an encoded video stream comprising key frames and delta frames, wherein the delta frames are organized in a hierarchical prediction pattern comprising a plurality of temporal layers. The video encoding method further comprises adding to the encoded video stream a hidden delta frame for at least some of the key frames. Each hidden delta frame corresponds to a key frame, is based on same original video data as the corresponding key frame and is referring to a previous key frame in the encoded video stream. Also, a method of reducing a file size of the video stream encoded according to the video encoding method is disclosed.

16 Claims, 6 Drawing Sheets

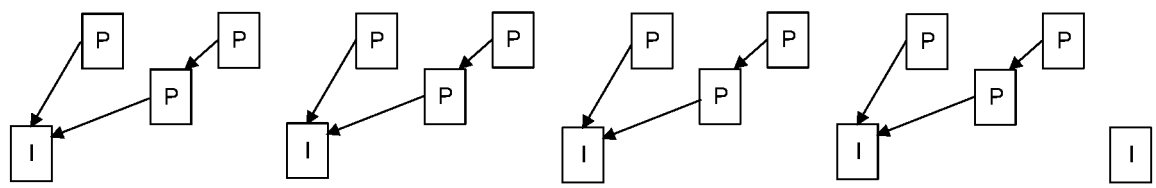
FIG. 3 *(Prior art)*
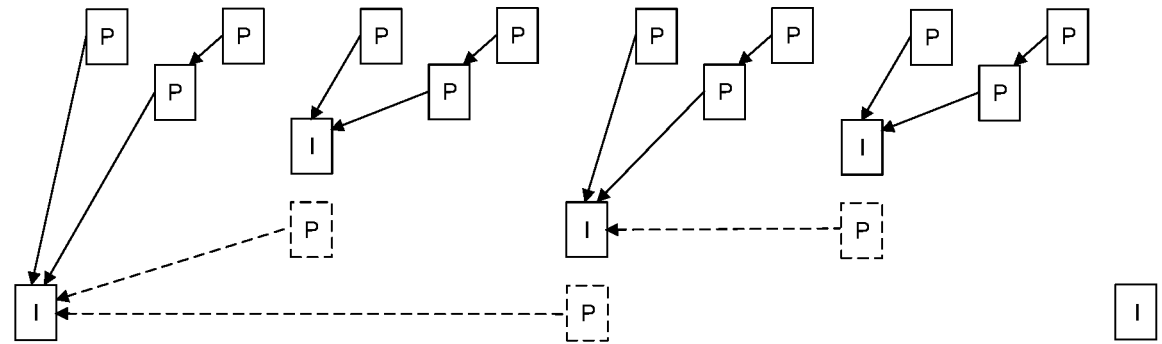
FIG. 4

VIDEO ENCODING METHOD AND METHOD FOR REDUCING FILE SIZE OF ENCODED VIDEO

TECHNICAL FIELD

The present invention relates to video encoding method. The present invention also relates to a method of reducing a file size of an encoded video stream encoded according to the video encoding method. Also, an encoder configured to perform the video encoding method as well as a processor configured to perform the method of reducing a file size of an encoded video stream encoded according to the video encoding method are set forth herein.

BACKGROUND

There is a growing need for long term video storage for captured video, e.g. for surveillance video. However, long term video storage is storage space demanding. Some available options for reducing the storage space for long term video storage is to accept a lower quality and/or lower frame rate for unused video that has been stored a long time. However, this typically requires a transcoding of the unused video.

Another option, not requiring transcoding, is to for an encoded video stream first remove the delta-frames (P and/or B-frames in the case of H.264) and thereafter remove key frames (I-frame in the case of H.264). Since key-frames are a major contributor to the file size there would be little gain from just removing the delta-frames. Hence, a lot of information in the video stream is needed to be removed in order to save file size.

Hence, there is a need for a method of reducing a file size of unused video without requiring transcoding and/or without sacrificing too much of the information of the video stream.

SUMMARY

Mitigating, alleviating or eliminating one or more of the above-identified deficiencies in the art and disadvantages singly or in any combination and at least partly solve the above-mentioned problem would be beneficial.

According to a first aspect a video encoding method is provided. The video encoding method comprises encoding a series of images of original video data into an encoded video stream comprising key frames and delta frames. In connection with the encoding, the delta frames are organized in a hierarchical prediction pattern comprising a plurality of temporal layers. The method further comprises adding to the encoded video stream a hidden delta frame for at least some of the key frames, wherein each hidden delta frame: corresponds to a key frame, is based on same original video data as the corresponding key frame, and is referring to a previous key frame in the encoded video stream.

The present method provides an encoded video stream with a frame structure that provides easy and processing undemanding file size reduction of the encoded video stream. This since the at least some key frames later on may be replaced by a corresponding hidden delta frame. Hence, the file size of an encoded video stream with the frame structure as achieved by the present method may later be reduced by processing undemanding trick of replacing one or more key frames with the corresponding hidden delta frame(s). Accordingly, an encoded video stream with an improved frame structure is provided. The improvement lays in that the encoded video stream may at a later point in time be file size reduced in a simple and processing undemanding manner.

Each hidden delta frame may be directly referring to a previous key frame in the encoded video stream.

At least two subsequent hidden delta frames in the encoded video stream may directly refer to a same previous key frame in the encoded video stream.

In the encoded video stream an odd number of delta frames may refer, directly or indirectly, to each key frame.

The hierarchical prediction pattern may comprise two or more temporal layers.

According to a second aspect a non-transitory computer-readable storage medium is provided. The non-transitory computer-readable storage medium having stored thereon instructions for implementing the method according to the first aspect, when executed on a device having processing capabilities.

According to a third aspect a method of reducing a file size of an encoded video stream encoded according to the method according to the first aspect is provided. The method of reducing the file size of the encoded video stream comprises replacing one or more key frames in the encoded video stream with a corresponding delta frame. The replacing is performed by: removing the one or more key frames from the encoded video stream, and unhiding the hidden delta frames corresponding to the removed one or more key frames. Thereby, an encoded video stream with a reduced file size is formed. This is since typically a delta frame take much less memory space than a key frame.

The method of reducing the file size of the encoded video stream may further comprise removing delta frames in an upper temporal layer of the hierarchical prediction pattern. In doing so, the file size may be even further reduced. Further, by doing so the frame rate of the encoded video stream may be reduced, typically halved.

The step of replacing one or more key frames in the encoded video stream with a delta frame may be performed for every second key frame in the encoded video stream.

The method of reducing the file size of the encoded video stream may further comprise replacing one or more key frames in the encoded video stream with a reduced file size with a delta frame. Again, the replacing may be performed by: removing the one or more key frames from the encoded video stream with a reduced file size, and unhiding the hidden delta frames corresponding to the removed one or more key frames. Thereby an encoded video stream with a further reduced file size is formed.

According to a fourth aspect a non-transitory computer-readable storage medium is provided. The non-transitory computer-readable storage medium having stored thereon instructions for implementing the method according to the third aspect, when executed on a device having processing capabilities.

According to a fifth aspect a video encoder is provided. The video encoder is configured to encode a series of images of video data into an encoded video stream comprising key frames and delta frames, wherein the delta frames are organized in a hierarchical prediction pattern comprising a plurality of temporal layers. The encoder is further configured to add to the encoded video stream a hidden delta frame for at least some of the key frames. Each hidden delta frame corresponds to a key frame, is based on the same original video data as the corresponding key frame, and is referring to a previous key frame in the encoded video stream.

The video encoder may be implemented in a video camera.

According to a sixth aspect the video management server is provided. The video management server configured to reduce a file size of an encoded video stream encoded according to the method of the first aspect or by the video encoder according the fifth aspect. The video management server comprises a processing circuit configured to replace, using a key frame replacement function, one or more key frames in the encoded video stream with a corresponding delta frame, wherein the key frame replacement function is configured to remove the one or more key frames from the encoded video stream, and unhide the hidden delta frames corresponding to the removed one or more key frames.

The processing circuit may further be configured to remove, using a delta frame removing function, delta frames in an upper temporal layer of the hierarchical prediction pattern of the encoded video stream.

A further scope of applicability of the present teachings will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that the teachings are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

FIG. 3 schematically illustrates a frame structure of an encoded video stream in accordance with prior art.

FIG. 4 schematically illustrates a frame structure of an encoded video stream in accordance with the present teachings.

DETAILED DESCRIPTION

The present teachings will now be described more fully hereinafter with reference to the accompanying drawings, in which currently preferred embodiments are shown. The teachings may, however, be embodied in many different forms and should not be construed as limited to the embodiments set forth herein; rather, these embodiments are provided for thoroughness and completeness, and to fully convey the scope of the invention to the skilled person.

Figure 1:
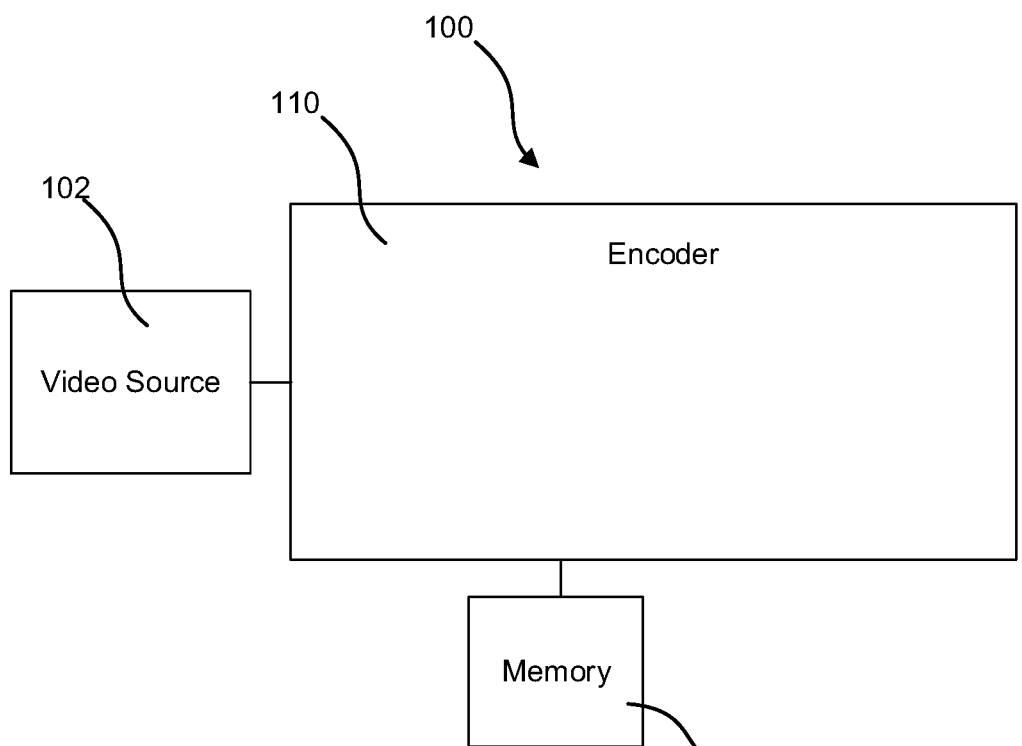
FIG. 1 schematically illustrates an encoder.

In connection with FIG. 1 a video encoding system 100. The video encoding system 100 comprises a video source 102, an encoder 110 and a memory 120. The encoder 110 is configured to encode a series of images of video data into an encoded video stream. The video data in the form of a series of images is received from the video source 102. The video source may be an image sensor. The video encoder 110 may be set to use any suitable encoding scheme. Non-limiting examples are H.264, H.265 and AV1. The video encoder 100 may be in communication with the memory 120. The memory 120 may be used as a buffer memory during the encoding of the video data. The memory 120 may comprise one of more memory portions. A specific memory portion may be a volatile memory portion. A specific memory portion may be a non-volatile memory portion. Hence, the memory 120, may comprise both volatile and non-volatile memory portions.

Figure 2:
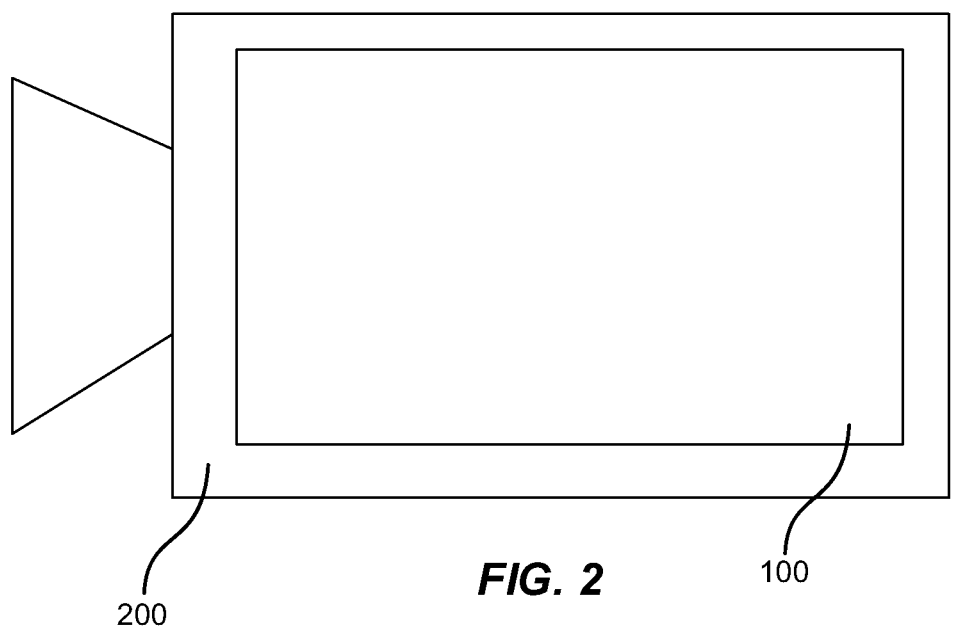
FIG. 2 schematically illustrates a camera comprising the encoder of FIG. 1.

As illustrated in FIG. 2, the video encoding system 100 may be implemented in a video camera 200. The video camera 200 may be digital video camera. The video camera 200 may be a monitoring camera. The video camera 200 may be a video camera being mounted on a moving object, such as a vehicle. The video camera 200 may be worn by a person.

The video encoder 100 is configured to encode the series of images of the video data into an encoded video stream. The video encoder 100 is configured to encode some of the images of the video stream as key frames. A key frame is an encoded video frame that does not require information from other encoded video frames to be decoded. Hence, a key frame is encoded based on information from the image of the video data it is set to correspond to. Typically, similarities within the image is used to encode the image into a key frame. In video encoding a key frame is also known as an intra frame, often referred to as an I-frame. The video encoder 100 is further configured to encode the images of the video stream in between two key frames as delta frames. Typically, a delta frame only comprises changes that occur from one frame to the next. Hence, delta frames are typically comprising less data than key frames. In video encoding a delta frame is also known as an inter frame, often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame.

Further, the video encoder 100 is configured organized the delta frames in a hierarchical prediction pattern comprising a plurality of temporal layers. Hence, the encoded video stream is encoded in a plurality of hierarchically organized Group Of Pictures, GOPs. Each hierarchically organized GOP comprises a key frame and a plurality of hierarchically organized delta frames. The hierarchically organized delta frames are organized in temporal layers.

An example of such a hierarchical prediction pattern comprising frames and P-frames is illustrated in FIG. 3. In FIG. 3 an example is illustrated where every 4th frame is an I-frame, and the hierarchical prediction pattern results in two temporal layers of P-frames. This way of encoding is often referred to hierarchical coding structure. In a hierarchical coding structure the hierarchical frame referencing structure leads to temporal layering of the encoded video stream. Note that the frame structure should be seen as a continuous stream of frames. The use of branches extending upwards is only an approach to clarify the structure of the hierarchical coding structure and the layered structure of the hierarchical prediction pattern.

Thus far the video encoder 100 is set to encode in accordance with already known encoding schemes. Hence, what is disclosed in connection with FIG. 3 is a prior art encoding scheme according to a hierarchical coding structure. However, the video encoder 100 is further configured to add to the encoded video stream a hidden delta frame for at least some of the key frames. A hidden delta frame is to be seen as a frame in the encoded video stream that typically is not outputted by the decoder at the decoder side when the decoder decodes the video stream. As such, a hidden delta frame may e.g. be a no-display frame or an auxiliary frame. Another way to indicate a hidden frame is to make use of bits or bit combinations in the header that, according to the standard at hand, are unspecified. For example, in the H.264 and H.265 standards, the network abstraction layer (NAL) units are provided with header information which includes the type of the NAL unit. The indication may be provided by setting a value of the NAL, unit type of NAL units associated with the delta frame. The value may be set to indicate that the NAL units should not be decoded by a standardized decoder. Thus, by providing the indication in this way, a standardized decoder will automatically disregard the delta frame associated with the NAL unit. Hence, a hidden delta frame is provided. The value of the NAL may later be rewritten to "unhide" the hidden delta frame.

The video encoder 100 is configured to encode a specific hidden delta frame based on the same image of the video data as the key frame it corresponds to. Hence, a specific hidden delta frame is encoded based on the same original video data as the corresponding key frame is based on. Thus, each hidden delta frame corresponds to a key frame. Further, the video encoder 100 is configured to use a previous key frame as a reference frame for the hidden delta frame. Hence, a hidden delta frame is set to refer to a previous key frame in the encoded video stream. More precisely, it may be said that a hidden delta frame is set to directly refer to a previous key frame in the encoded video stream.

The structure of an encoded video stream being encoded by the video encoder 100 is illustrated in connection with FIG. 4. In FIG. 4 the hidden delta frames are illustrated using dashed lines. Further, in FIG. 4 the hidden delta frames are illustrated as P-frames, but other kind of delta frames may also be used. The use of a previous key frame as a reference frame for the hidden delta frame is illustrated with a dashed arrow in FIG. 4.

The video encoder 100 may further be configured to use a same previous key frame as a reference frame for two or more subsequent hidden delta frames in the encoded video stream. Hence, two or more subsequent hidden delta frames may directly refer to a same previous key frame in the encoded video stream.

Figure 5:
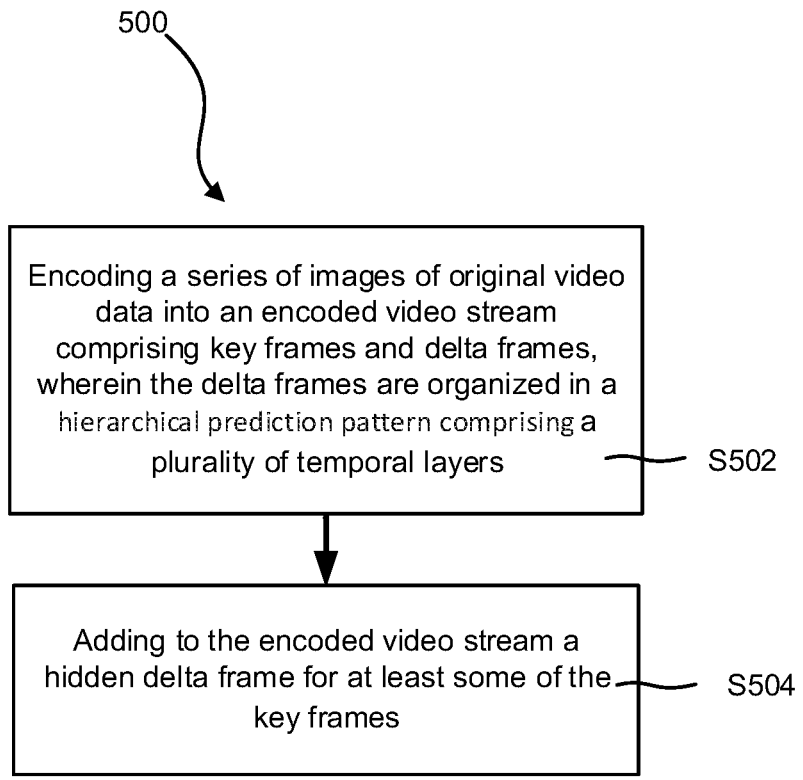
FIG. 5 is a block scheme of a video encoding method.

In connection with FIG. 5 a video encoding method 500 configured to encode a series of images of original video data into an encoded video stream will be discussed. The video encoding method may be configured to encode video data captured by a camera. The camera may be a monitoring camera. The video processing method comprises the following steps/acts.

Encoding S502 a series of images of original video data into an encoded video stream comprising key frames and delta frames. Key frames and delta frames are discussed above in connection with the video encoder 100, and in order to avoid undue repetition reference is made to the above discussion. During the encoding S502 the delta frames are organized in a hierarchical prediction pattern comprising a plurality of temporal layers. The hierarchical prediction pattern is discussed above in connection with the video encoder 100, and in order to avoid undue repetition reference is made to the above discussion.

Adding S504 to the encoded video stream a hidden delta frame for at least some of the key frames. A hidden delta frame may e.g. be a no-display frame or an auxiliary frame. Each specific hidden delta frame is based on the same image of the video data as the key frame it corresponds to. Hence, a specific hidden delta frame is encoded based on the same original video data as the corresponding key frame is based on. Thus, each hidden delta frame corresponds to a key frame. Further, a previous key frame is used as a reference frame for the hidden delta frame. Hence, a hidden delta frame is set to refer to a previous key frame in the encoded video stream. The structure of an encoded video stream encoded according to the present method 500 is illustrated in connection with FIG. 4. As discussed above, in FIG. 4 the hidden delta frames are illustrated using dashed lines. Further, in FIG. 4 the hidden delta frames are illustrated as P-frames, but other kind of delta frames may also be used.

Figure 6:
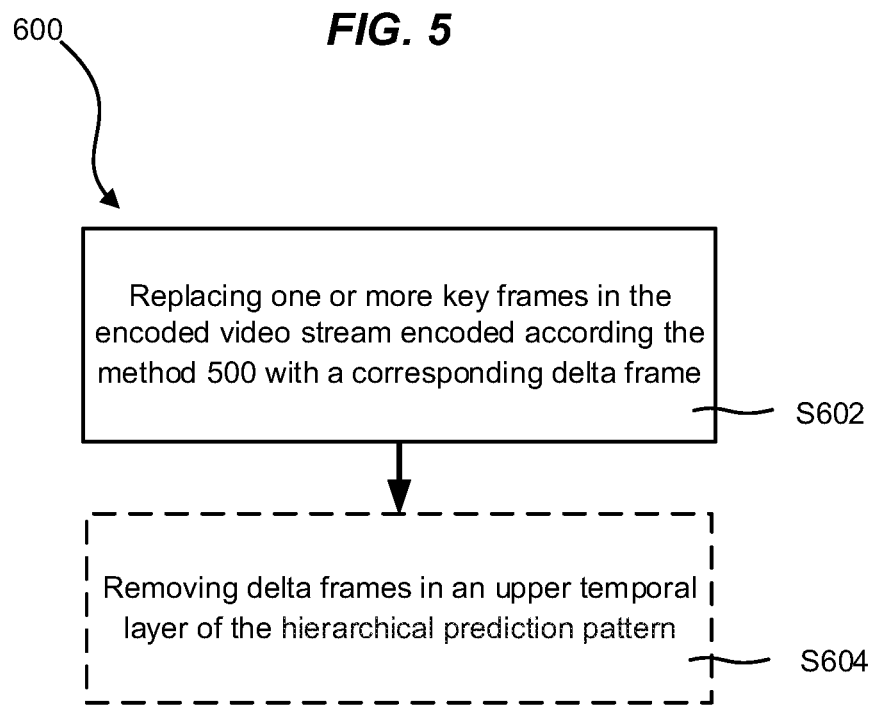
FIG. 6 is a block scheme of a method of reducing a file size of an encoded video stream.

In connection with FIG. 6 a method 600 of reducing a file size of an encoded video stream encoded according to the video encoding method 500 will be discussed. The method 600 of reducing a file size of the encoded video stream comprises the step of replacing S602 one or more key frames in the encoded video stream with a corresponding delta frame. The replacing S602 is performed by removing the one or more key frames from the encoded video stream, and unhiding the hidden delta frames corresponding to the removed one or more key frames. By this a file size of the encoded video stream is reduced. Hence, an encoded video stream with a reduced file size may be formed. This since typically a key frame take up much more memory space as compared with a delta frame. Hence, by replacing a key frame with a delta frame the file size of the encoded video stream is reduced.

The step of replacing S602 one or more key frames in the encoded video stream with a delta frame may be performed for every second key frame in the encoded video stream.

The method 600 of reducing a file size of the encoded video stream may further comprise removing S604 delta frames in an upper temporal layer of the hierarchical prediction pattern. By this the file size of the encoded video stream with reduced file size may be further reduced. This since frames are deleted from the encoded video stream. This step also result in that the frame rate of the encoded video stream is reduced, it is halved.

Figure 7:
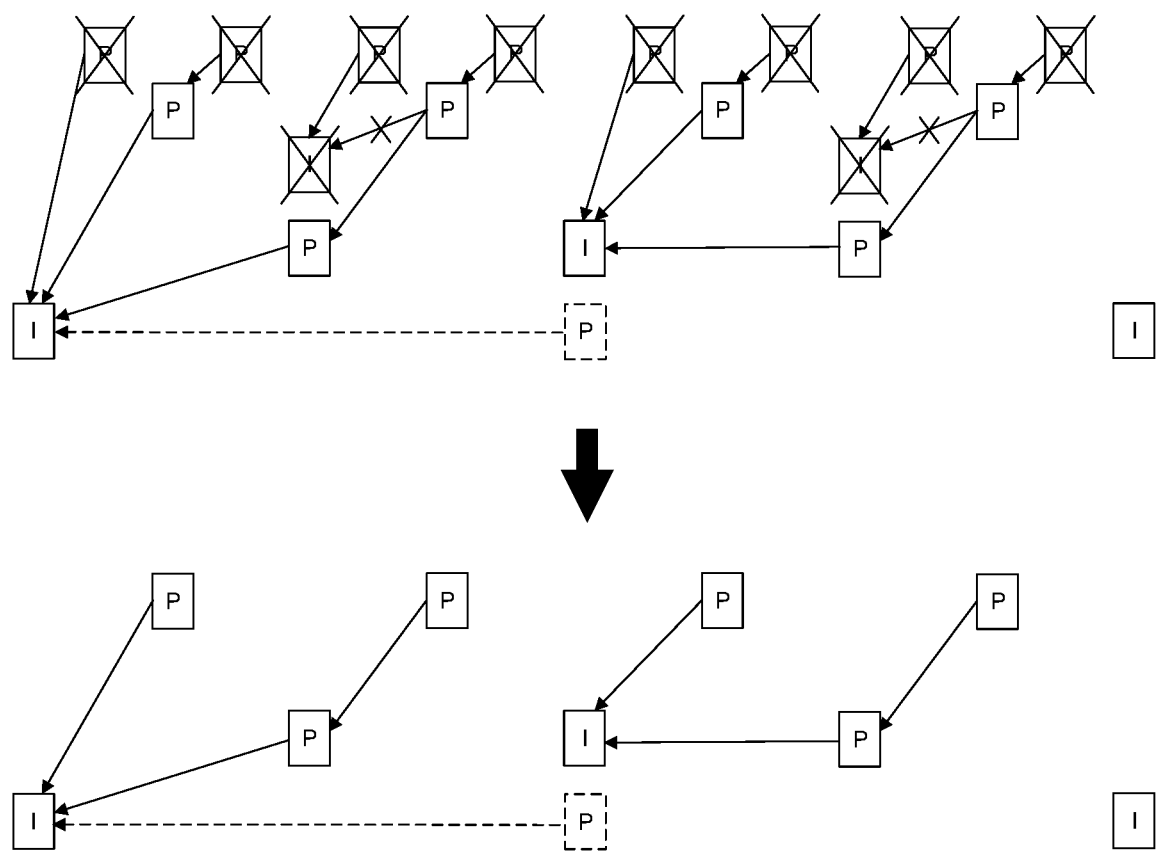
FIG. 7. schematically illustrates reduction of file size of the encoded video stream illustrated in FIG. 4.

In connection with FIG. 7 the result of applying the method 600 of reducing the file size a first time to the encoded video stream illustrated in connection with FIG. 5 being encoded by the video encoding method 500 is illustrated. As can be seen in the top portion of FIG. 5 every second key frame, in this case every second I-frame, is replaced by the corresponding hidden delta frame, in this case a hidden P-frame. Further, the delta frames, in this case P-frames, in an upper temporal layer of the hierarchical prediction pattern are removed, as illustrated by crossing across the upper temporal layer P-frames. The resulting encoded video stream with a reduced file size is illustrated in the lower portion of FIG. 7.

Figure 8:
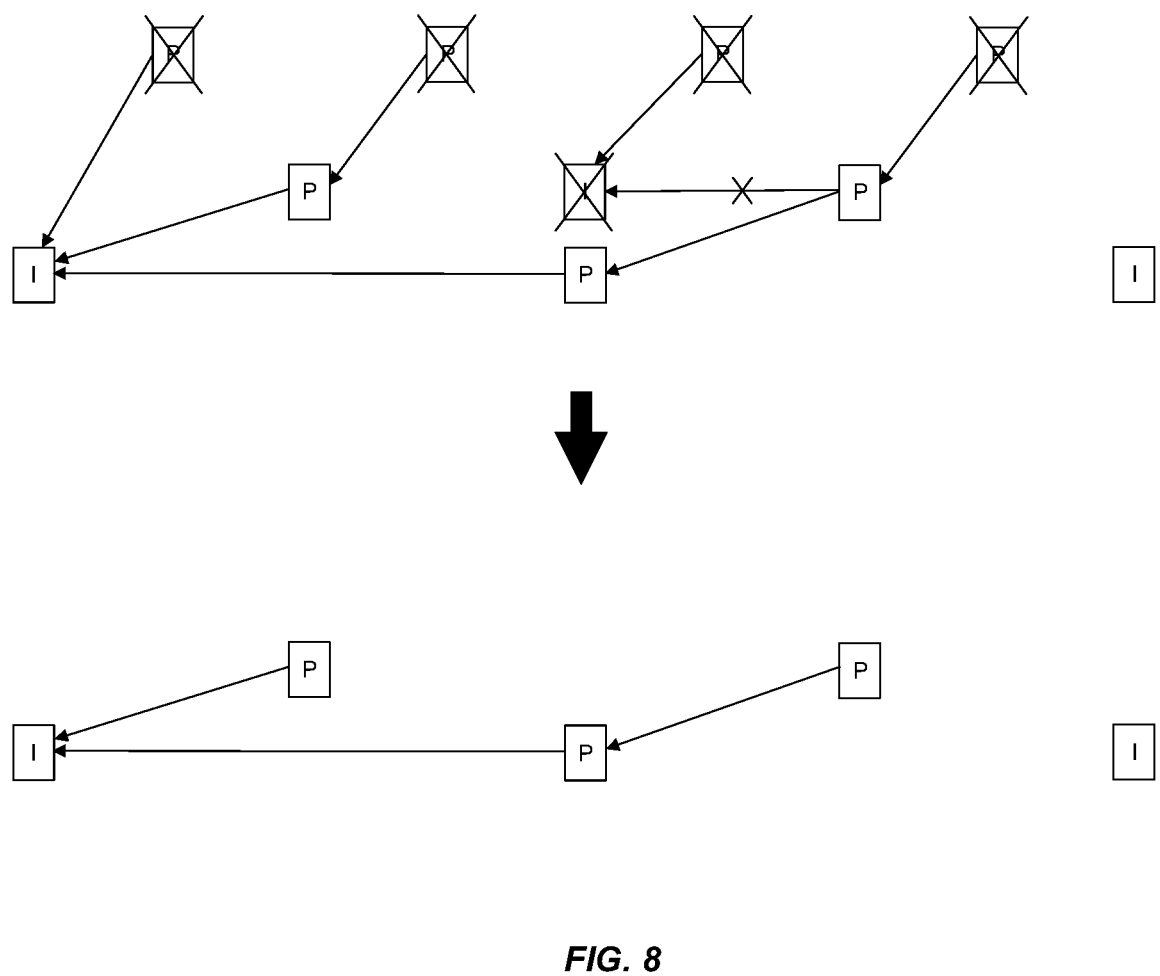
FIG. 8. schematically illustrates reduction of file size of the encoded video stream illustrated in FIG. 7.

The method 600 of reducing a file size may further be applied to the resulting encoded video stream with a reduced file size gained by applying the method 600 a first time on the encoded video stream being encoded by the video encoding method 500. The result of such a second run of the method 600 of reducing a file size is illustrated in connection with FIG. 8 made according to the same scheme as FIG. 7.

Figure 9:
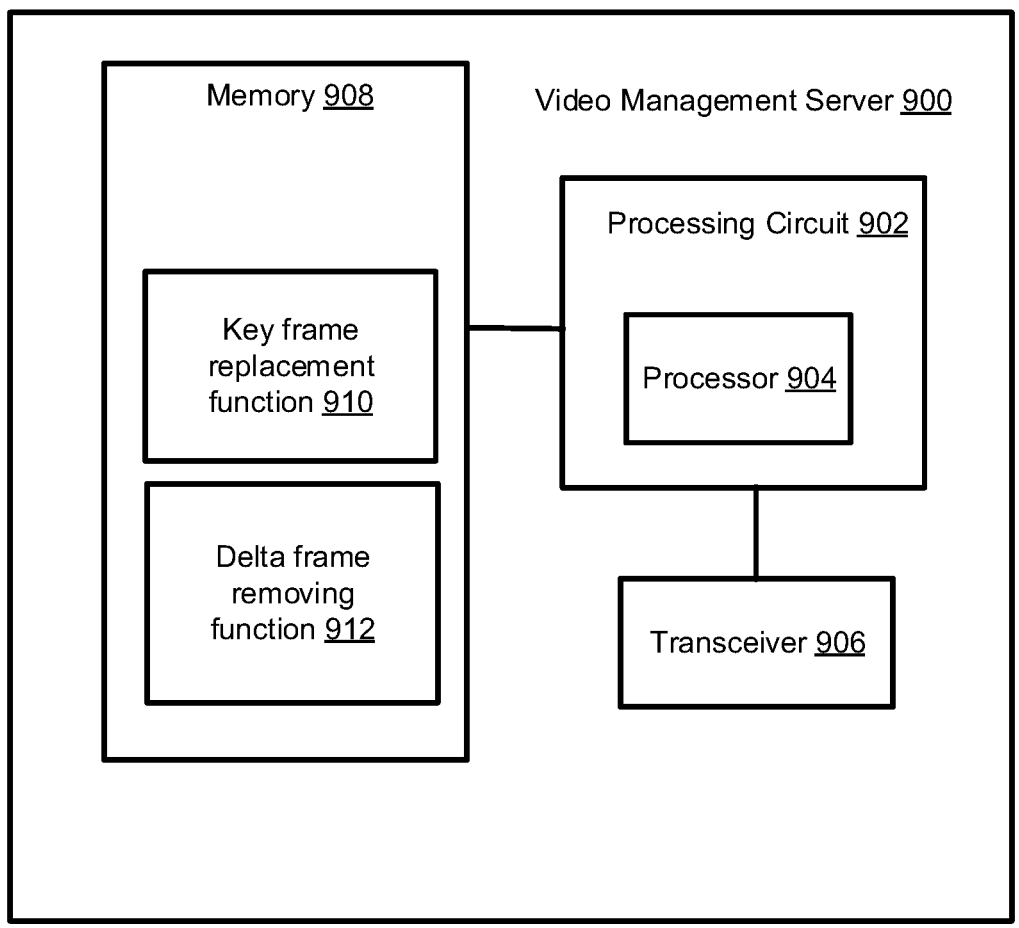
FIG. 9 schematically illustrates a video management server.

In connection with FIG. 9 a video management server 900 configured to reduce a file size of an encoded video stream encoded by the video encoder 100 discussed above or encoded according to the video encoding method 500 discussed above. The video management server 900 may comprise a processing circuit 902, a transceiver 906 and a memory 908.

The transceiver 906 is configured receive and/or send information and/or from the video management server 900. Especially, the transceiver 906 may be configured to receive the encoded video stream encoded by the video encoder 100 discussed above or encoded according to the video encoding method 500 discussed above.

The memory 908 may be one or more of a buffer, a flash memory, a hard drive, a removable media, a volatile memory, a non-volatile memory, a random access memory (RAM), or another suitable device. In a typical arrangement, the memory 908 may include a non-volatile memory for long term data storage and a volatile memory that functions as system memory for the processing circuit 902. The memory 908 may exchange data with the processing circuit 902 over a data bus. Accompanying control lines and an address bus between the memory 908 and the processing circuit 908 also may be present. The memory may further be configured to store the encoded video stream.

The processing circuit 902 is configured to carry out overall functions of the video management server 900. The processing circuit 902 may include a processor 906, such as a central processing unit (CPU), microcontroller, or microprocessor. The processor 906 is configured to execute program code stored in the memory 908, in order to carry out functions of the video management server 900.

Functions of the video management server 900 may be embodied in the form of executable logic routines (e.g., lines of code, software programs, etc.) that are stored on a non-transitory computer readable medium (e.g., the memory 908) of the video management server 900 and are executed by the processing circuit 902 (e.g., using the processor 906). Furthermore, the functions of the video management server 900 may be a stand-alone software application or form a part of a software application that carries out additional tasks related to the video management server 900. The described functions may be considered a method that the corresponding device is configured to carry out. Also, while the described functions may be implemented in software, such functionality may as well be carried out via dedicated hardware or firmware, or some combination of hardware, firmware and/or software.

The processing circuit 902 may execute a key frame replacement function 910. The key frame replacement function 910 is configured to replace one or more key frames in the encoded video stream with a corresponding delta frame. More precisely, the key frame replacement function 910 is configured to perform the replacement by removing the one or more key frames from the encoded video stream, and unhiding the hidden delta frames corresponding to the removed one or more key frames. By executing the key frame replacement function 910 the file size of the encoded video stream may be reduced, and a reduced sized encoded video stream is formed. This is discussed in more detail above in connection with the method 600 of reducing a file size of an encoded video stream. In order to avoid undue repetition reference is made to the above.

The processing circuit 902 may execute a delta frame removing function 912. The delta frame removing function 912 is configured to remove delta frames in an upper temporal layer of the hierarchical prediction pattern of the encoded video stream. By executing the delta frame removing function 912 the file size of the encoded video stream may be reduced, and a reduced sized encoded video stream is formed. This is discussed in more detail above in connection with the method 600 of reducing a file size of an encoded video stream. In order to avoid undue repetition reference is made to the above.

The person skilled in the art realizes that the present teachings by no means are limited to the preferred embodiments described above. On the contrary, many modifications and variations are possible within the scope of the appended claims.

For example, the video encoder 100 may be configured to encode the series of images of the video data into an encoded video stream such that an odd number of delta frames are referring, directly or indirectly, to a specific key frame.

Moreover, in connection with the removing of the delta frames in an upper temporal layer of the hierarchical prediction pattern, the removed delta frames may be replaced with empty frames. Doing so the frame rate will be maintained although the information in the video stream will be reduced. The empty frames comprise no information, instead an empty frame refers to an earlier frame, such a frame may also be referred to as a skip frame. The replacement of the delta frames with the empty frames may be especially useful for decoders where the time period between two frames need to be fixed.

Furthermore, the above-mentioned method for video encoding may be used using a scalable video-codec such as SVC, SHVC and SVT.

Additionally, variations to the disclosed embodiments can be understood and effected by the skilled person in practicing the claimed invention, from a study of the drawings, the disclosure, and the appended claims.

The invention claimed is:

1. A video encoding method comprising:
   encoding a series of images of original video data into an encoded video stream comprising key frames and delta frames, wherein the delta frames are organized in a hierarchical prediction pattern comprising a plurality of temporal layers;
   adding to the encoded video stream a hidden delta frame for at least some of the key frames, wherein each hidden delta frame:
   corresponds to a key frame,
   is based on same original video data as the corresponding key frame, and
   refers to a previous key frame in the encoded video stream.

2. The video encoding method according to claim 1, wherein each hidden delta frame directly refers to a previous key frame in the encoded video stream.

3. The video encoding method according to claim 1, wherein at least two subsequent hidden delta frames in the encoded video stream directly refer to a same previous key frame in the encoded video stream.

4. The video encoding method according to claim 1, wherein in the encoded video stream an odd number of delta frames refer, directly or indirectly, to each key frame.

5. The video encoding method according to claim 1, the hierarchical prediction pattern comprises two or more temporal layers.

6. A method of reducing a file size of an encoded video stream encoded according to the method of claim 1, the method of reducing the file size of the encoded video stream comprising:
  replacing one or more key frames in the encoded video stream with a corresponding delta frame by:
    removing the one or more key frames from the encoded video stream, and
    unhiding the hidden delta frames corresponding to the removed one or more key frames;
  thereby forming the encoded video stream with a reduced file size.

7. The method according to claim 6, further comprising:
  removing delta frames in an upper temporal layer of the hierarchical prediction pattern.

8. The method according to claim 6, wherein the step of replacing one or more key frames in the encoded video stream with a delta frame is performed for every second key frame in the encoded video stream.

9. The method according to claim 6, further comprising:
  replacing one or more key frames in the encoded video stream with a reduced file size with a delta frame by:
    removing the one or more key frames from the encoded video stream with a reduced file size, and
    unhiding the hidden delta frames corresponding to the removed one or more key frames;
  thereby forming an encoded video stream with a further reduced file size.

10. A non-transitory computer-readable storage medium having stored thereon instructions, when executed on a device having processing capabilities, for implementing the video encoding method comprising:
  encoding a series of images of original video data into an encoded video stream comprising key frames and delta frames, wherein the delta frames are organized in a hierarchical prediction pattern comprising a plurality of temporal layers;
  adding to the encoded video stream a hidden delta frame for at least some of the key frames, wherein each hidden delta frame:
    corresponds to a key frame,
    is based on same original video data as the corresponding key frame, and
    refers to a previous key frame in the encoded video stream;
  replacing one or more intra frames in the encoded video stream with a corresponding inter frame by:
    removing the one or more intra frames from the encoded video stream, and
    unhiding the hidden inter frames corresponding to the removed one or more intra frames;
  thereby forming the encoded video stream with a reduced file size.

11. A video encoder configured to:
  encode a series of images of video data into an encoded video stream comprising key frames and delta frames, wherein the delta frames are organized in a hierarchical prediction pattern comprising a plurality of temporal layers; and
  add to the encoded video stream a hidden delta frame for at least some of the key frames, wherein each hidden delta frame:
    corresponds to a key frame,
    is based on the same original video data as the corresponding key frame, and
    is referring to a previous key frame in the encoded video stream.

12. The video encoder according to claim 11, implemented in a video camera.

13. video management server configured to reduce a file size of an encoded video stream, the video management server comprising:
  a processing circuit configured to:
    encode a series of images of original video data into an encoded video stream comprising key frames and delta frames, wherein the delta frames are organized in a hierarchical prediction pattern comprising a plurality of temporal layers;
    add to the encoded video stream a hidden delta frame for at least some of the key frames, wherein each hidden delta frame:
      corresponds to a key frame,
      is based on same original video data as the corresponding key frame, and
      refers to a previous key frame in the encoded video stream;
  replace, using a key frame replacement function, one or more key frames in the encoded video stream with a corresponding delta frame, wherein the key frame replacement function is configured to remove the one or more key frames from the encoded video stream, and unhide the hidden delta frames corresponding to the removed one or more key frames.

14. The video management server according to claim 13, wherein the processing circuit is further configured to remove, using a delta frame removing function, delta frames in an upper temporal layer of the hierarchical prediction pattern of the encoded video stream.

15. A video management server configured to reduce a file size of an encoded video stream encoded by the video encoder according to claim 11, the video management server comprises:
  a processing circuit configured to replace, using a key frame replacement function, one or more key frames in the encoded video stream with a corresponding delta frame, wherein the key frame replacement function is configured to remove the one or more key frames from the encoded video stream, and unhide the hidden delta frames corresponding to the removed one or more key frames.

16. The video management server according to claim 15, wherein the processing circuit is further configured to remove, using a delta frame removing function, delta frames in an upper temporal layer of the hierarchical prediction pattern of the encoded video stream.

* * * * *